INVENTOR
Gustav Guanella

BY Pierce, Scheffler & Parker
ATTORNEYS

INVENTOR
Gustav Guanella

BY Pierce, Scheffler & Parker
ATTORNEYS

INVENTOR
Gustav Guanella
BY Pierce, Scheffler & Parker
ATTORNEYS

INVENTOR
Gustav Guanella
BY Pierce, Scheffler & Parker
ATTORNEYS

United States Patent Office 3,164,777
Patented Jan. 5, 1965

3,164,777

MEANS FOR THE PRODUCTION OF A VOLTAGE WHICH DEPENDS UPON THE DIFFERENCE BETWEEN TWO FREQUENCIES

Gustav Guanella, Zurich, Switzerland, assignor to Patelhold Patentverwertungs- & Elektro-Holding A.-G., Glarus, Switzerland Filed Feb. 9, 1960, Ser. No. 7,715
Claims priority, application Switzerland Feb. 18, 1959
4 Claims. (Cl. 328—134)

This invention relates to an improved method for producing a voltage which depends upon the difference between two frequencies.

Methods for comparing the frequencies of two oscillations are known where at least the frequency of one oscillation is reduced by a frequency divider so that two oscillations are formed whose frequencies normally are identical. From these latter oscillations, is obtained by a phase discriminator a regulating voltage which depends on its phase difference and which can influence the frequency of one oscillator in such a way that a constant phase difference is maintained between the two oscillations with identical frequencies. In this manner, a constant ratio is maintained between the two frequencies of the original oscillations which can, for example, be the oscillation of a frequency standard and the frequency of a high-frequency transmitter respectively, which are to be maintained in a certain ratio to each other.

These methods have some typical disadvantages. A change of frequency in the high frequency transmitter, for example, is connected with considerable work expenditure, because the oscillatory circuits of the individual steps of the frequency dividers must be adapted to the new frequency. Then, with greater differences of the frequencies to be compared with each other on the phase discriminator, as they are formed, for example, as a rule when starting the device, an alternating voltage is formed as a regulating voltage, which is not suitable to initiate a frequency regulation.

These disadvantages are avoided in the method according to the invention, which is characterized in that two normally periodic signals of equal frequency are obtained from the two original oscillations whose frequencies are to be compared with each other, a counter being used for obtaining at least one of the signals which emits upon arrival of a normally constant number of cycles of the original oscillation an output impulse, that a regulating voltage is produced by means of a phase discriminator in dependence on the mutual phase of the two signals, and that, when this phase lies outside a predetermined range, a temporary variation of the above mentioned number is effected to the extent and in the sense that a further migration of the phase from the predetermined range is prevented.

The invention will be explained in conjunction with the accompanying drawings which illustrate certain embodiments and modifications thereof.

Figure 1:
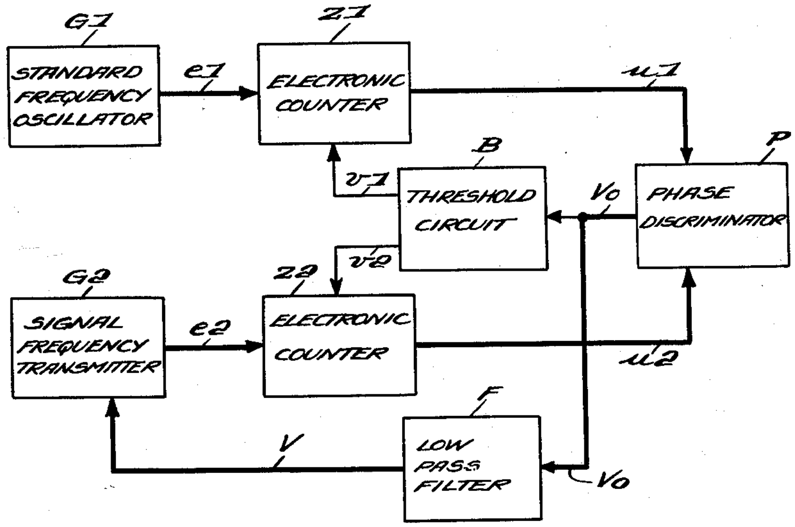
FIG. 1 is a block schematic electrical diagram of one arrangement of operating components in accordance with the invention.

The principal construction and the method of operation of a device operating in accordance with the improved method will be described on the basis of an embodiment according to FIG. 1, where G1 represents a frequency standard, that is, an oscillator with a particularly high constancy of frequency, whose frequency is assumed as identical with the carrier frequency of a transmitter G2. The electronic counters Z1 and Z2 are so designed in known manner that they emit an output impulse after arrival of a certain number $n$ (which is normally equal to $n_0$) of cycles of the original oscillations $e1$ and $e2$ fed to them respectively from the standard frequency oscillator G1 and the high frequency carrier of transmitter G2. The two impulse signals $u1$ and $u2$ produced by the counters Z1 and Z2, which are in the present case impulse sequences as indicated in FIG. 2 thus have, corresponding to the ratio $1/n$, lower frequencies than the original oscillations $e1$ and $e2$. By means of a phase discriminator P of known construction controlled by the impulses $u1$ and $u2$, an impulse-type regulating voltage $Vo$ is produced in dependence on the mutual phase of the two signals $u1$, $u2$. This regulating voltage influences, after smoothing, and in the case of a frequency-modulated transmitter, after liberation of modulation-frequency portions in a low pass filter F, the transmitter G2 as voltage V in such a way that it counteracts any deviations of its carrier frequency from its nominal value. The regulating voltage $Vo$ is also fed to a threshold circuit B of known construction. If it exceeds certain predetermined limits, that is, if the phase of the two signals monitored by phase discriminator P lies outside a predetermined range, a signal $v1$ or $v2$ appears at the output of discriminator B which effects a temporary variation of the number $n$ in the counter Z1 and Z2 respectively. This number is varied in the sense that a further migration of the phase from the predetermined range is prevented. For example, if the phase monitored by discriminator P leaves the predetermined range as a result of a reduction of the frequency of the oscillation $e2$ with regard to the frequency of the oscillation $e1$, the number $n$ in the counter Z2 can be reduced by the signal $v2$; or the number $n$ in the counter Z1 can be increased by the signal $v1$. Since the frequencies of the signals $u1$, $u2$ are thus brought closer together, a further migration of the monitored phase from the predetermined range can be prevented. A direct voltage will thus remain as a regulating voltage V, which is suitable for the production of the rated carrier frequency of the signal transmitter G2. When the phase enters again the predetermined range between $u1$ and $u2$, the signal $v1$ and $v2$ respectively disappears, and the influenced counter Z1 or Z2 works again with the normal number $n_0$.

An impulse-phase discriminator P suitable for use in the above described device can be formed by a bi-stable sweep circuit, which is known in itself and which is brought by the impulses $u1$ into one, and by the impulses $u2$ into the other stable position. The sweep circuit produces thus according to FIG. 2 an impulse sequence $Vo$, where the ratio of the positive sections T1 to the negative sections T2 is characteristic of the monitored phase $\varphi$ between the impulse sequences $u1$ and $u2$. If the impulse-sequence $Vo$ is produced earth-symmetrically, the sign of the mean direct voltage V, obtained therefrom by filtering in filter F (FIG. 1), is characteristic of the direction of the deviation of the phase $\varphi$ from its mean value, which corresponds to a half cycle of the impulse sequences $u1$ and $u2$ ($T1=T2$). Such a direct voltage is particularly suitable as a regulating voltage to influence an oscillator. From the impulse sequence $Vo$ the signal $v1$ or $v2$ can be obtained through the threshold circuit B (FIG. 1), for example, in this way that the lengths of the sections T1 and T2 are measured by integrating members and that the voltages appearing at the integrating members are compared with constant voltages. The signal $v1$ or $v2$ appears as soon as one of these voltages is greater than the associated constant voltage. The threshold circuit B must be so dimensioned that the signal v1 or v2 appears when T1 or T2 is small compared to ($T1+T2$), that is, when the phase $\varphi$ (FIG. 2) exceeds one of the limits $\varphi_{min}$ or $\varphi_{max}$.

Electronic counters which count up to a predetermined number $n$, and emit an impulse when this number is reached, to start the counting again, are known in themselves, likewise measures to vary the number $n$ arbitrarily. In particular it is also known to return the counter prematurely to the zero position by a special signal. By using these counters it is possible to obtain a particularly simple device which operates according to the method of the invention.

Figure 2:
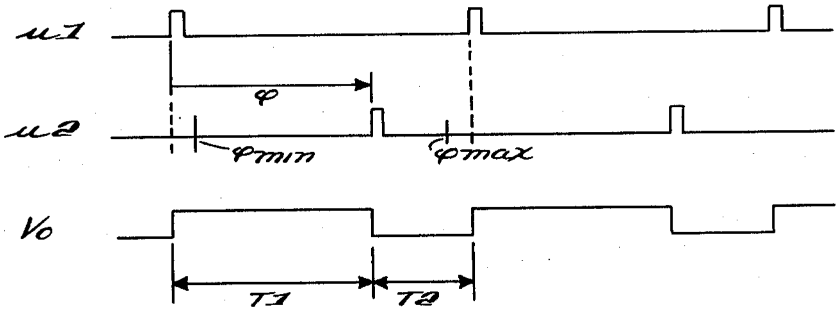
FIG. 2 is a plot of curves showing the relationship between control voltages produced in the circuit of FIG. 1.

In order to explain the method of operation of the device represented in FIG. 1, it is assumed that the frequency of the oscillation $e2$, diminishes, so that the phase $\varphi$ (FIG. 2), attains after sometimes the limit $\varphi_{max}$ and exceeds it. In the threshold circuit B, the voltage of the integrating member, which measures the length of the section T1, will then exceed the associated constant voltage before the impulse of the series $u2$ terminating the section T1 has arrived. This causes the formation of the signal $v2$, which returns the counter Z2 prematurely to the zero position, with the latter emitting at the same time an output signal $u2$. This output signal thus does not appear after $n_0$ cycles of the oscillation $e2$, but sooner. Care is thus taken that an impulse of the series $u2$ appears at any rate between two impulses each of the series $u1$.

Figure 3:
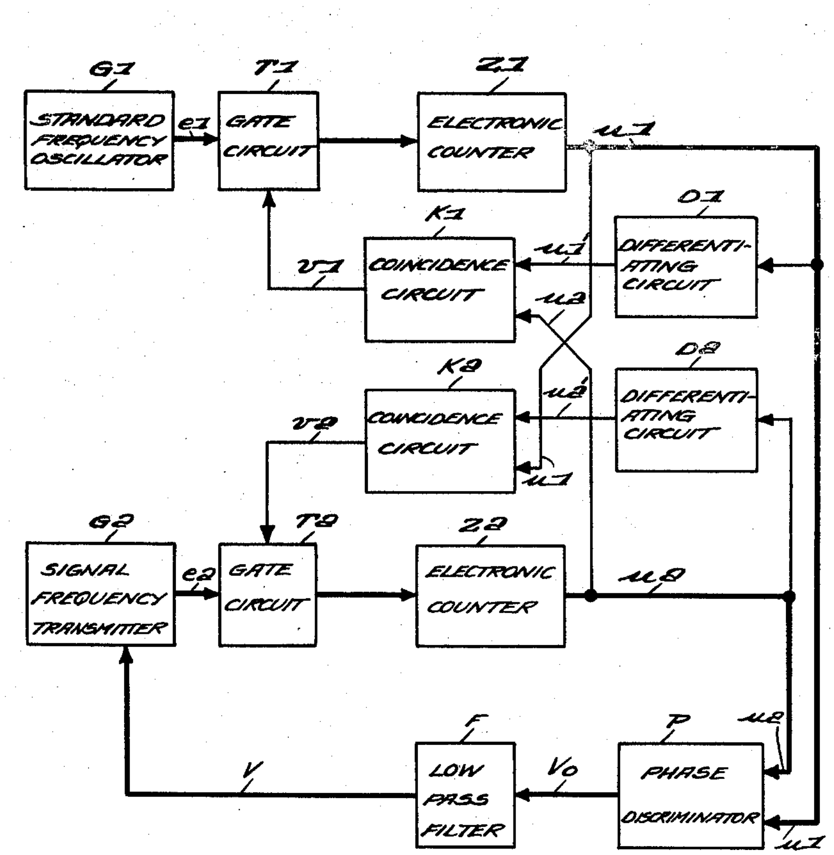
FIG. 3 is also a block schematic electrical diagram illustrating a second embodiment of the invention.

FIG. 3 shows schematically another device which operates on the method according to the invention. The oscillations $e1$ and $e2$ of the frequency standard G1 and of the transmitter G2 respectively are here fed to the counters Z1 and Z2 respectively over normally open gate circuits T1 and T2. The output impulses $u1$ and $u2$ of the counters arrive at the phase discriminator P, which produces therefrom at first an impulse-type regulating voltage $Vo$. The latter is smoothed in the low pass filter F to a direct voltage V, which serves to influence the carrier frequency of the transmitter G2 in the proper direction.

If it is assumed again that the frequency of the oscillation $e2$ diminishes, the phase $\varphi$ (see FIG. 2) will finally be so large that the rear edge of an impulse of the series $u2$ comes to lie behind the front edge of an impulse of the series $u1$, so that the impulses of the series $u1$ and $u2$ partly overlap. Such an overlapping causes a coincidence circuit K1 to respond, as it will be described later. The latter produces a signal $v1$ which closes the gate circuit T1. The counting of the cycles of the oscillation $e1$ is thus interrupted as long as the signal $v1$ is effective. The next output impulse of the counter Z1 appears thus not after $n_0$ cycles already, but later. Care is again taken that an impulse of the series $u2$ appears at any rate between two impulses each of the series $u1$, since the appearance of the impulses of the series $u1$ is delayed correspondingly, if necessary, by an increase of the number $n$.

Figure 4:
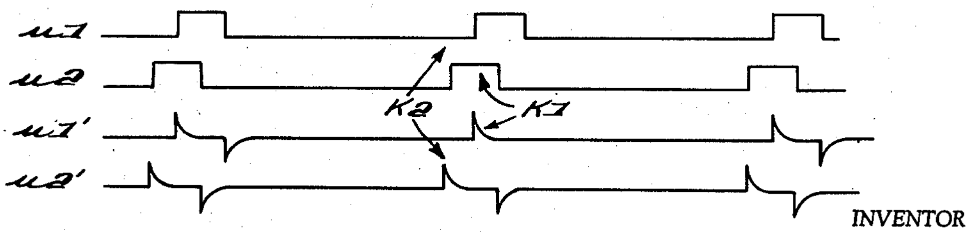
FIG. 4 is a plot of curves showing the relationship between control voltages produced by the FIG. 3 circuit.

It is now necessary to distinguish whether the above mentioned overlappings are brought about as a result of a very large or of a very small phase $\varphi$ (FIG. 2), because in the former case the gate circuit T1, in the latter case the gate circuit T2, must be closed. This distinction is effected by differentiating the impulse series $u1$ and $u2$ by the differentiating circuits D1 and D2 respectively and by feeding to the coincidence circuit K1 (K2) on the one hand the impulses $u2$ ($u1$) and on the other hand the signals obtained by the differentiation of the impulses $u1$ ($u2$), the latter in the sense that the signal portions corresponding to the front edge of the impulses $u1$ ($u2$) are determinant for any coincidences. FIG. 4 illustrates this measure, the impulses of the series $u1$, $u2$, being represented relatively long to increase the clarity. It shows the state that appears when the phase $\varphi$ is very large. It can be seen that a coincidence appears at K1 between the positive signal portion of $u1'$ (which marks the front edge of the impulses of $u1$) and the (positive) impulse $u2$, but there is no coincidence at K2, because the impulse of $u2$ is missing at the time of the positive signal portion of $u2'$. With a large phase $\varphi$ the coincidence circuit K1 (FIG. 3) will thus respond, with a small phase the coincidence circuit K2.

Instead of the impulses $u1$, $u2$, the differentiated signals $u1'$ and $u2'$ can also be fed to the phase discriminator P.

Figure 5:
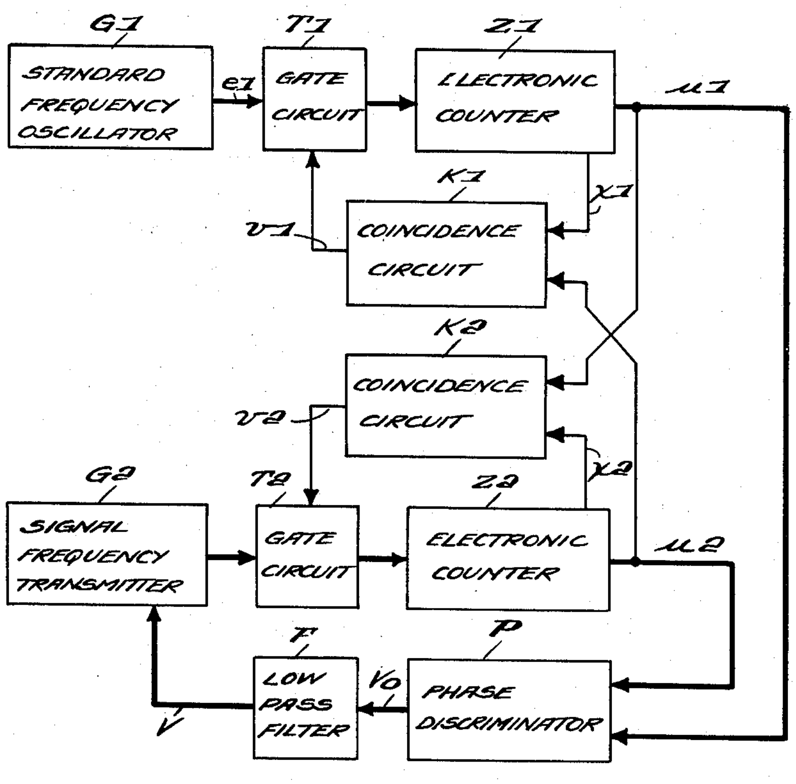
FIG. 5 is a block schematic electrical diagram illustrating a modification of the arrangement shown in FIG. 3.

FIG. 5 illustrates another embodiment of the invention similar to that of FIG. 3 but providing a somewhat different method for determining whether the partial overlap between the impulses of the series $u1$ and $u2$ are the result of a very large or a very small phase difference $\varphi$. According to this method impulse signals are also obtained from the two original oscillations, a counting device being used for obtaining at least one impulse sequence which emits, in addition to the output impulse, and auxiliary impulse preceding the latter in time. Furthermore two coincidence circuits are used. Each of these is fed with the impulses of one impulse sequence, at least one of the coincidence circuits with a sequence of auxiliary impulses.

Figure 6:
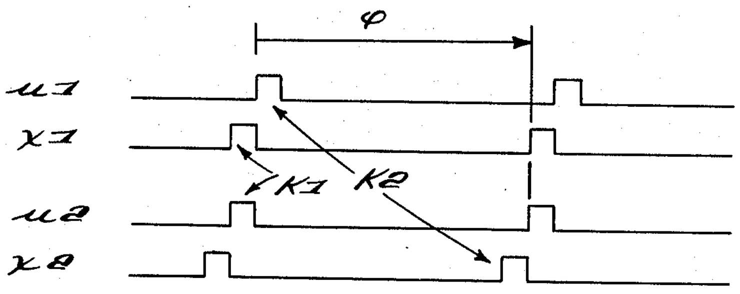
FIG. 6 is a plot of curves showing the relationship between control voltages produced by the FIG. 5 circuit.

The method of operation of a device operating according to this method is described with reference to FIGS. 5 and 6. In FIG. 6, G1 represents a frequency standard, that is, an oscillator with a particularly high frequency constancy, whose frequency is assumed as identical with the carrier frequency of a signal transmitter G2. T1 and T2 are normally open gate circuits which will be discussed later. The electronic counters Z1 and Z2 are so designed in known manner that they emit an output signal $u1$ and $u2$ respectively upon arrival of a certain number $n$ (which is normally equal to $n_0$) of cycles of the original fed oscillations $e1$ and $e2$ respectively and that they start the counting again. The two impulse sequences $u1$ and $u2$ have thus, corresponding to the ratio $1/n$, lower frequencies than the original oscillations $e1$ and $e2$. By means of a phase discriminator P, a regulating voltage $Vo$ is generated in dependence on the mutual phase of the two signals $u1$, $u2$. This regulating voltage influences the frequency generated by transmitter G2, as a voltage V, after smoothing and, in the case of a frequency modulated transmitter, after liberation of modulation frequency portions in a low pass filter F, in such a way as to counteract any deviations of its carrier frequency from its nominal value.

According to the previous embodiments a temporary variation of the number $n$ is to be effected in the counter Z1 or Z2, as soon as the phase $\varphi$ monitored by discriminator P lies outside a predetermined range, the number $n$, being varied in the sense that an additional migration of the phase from the predetermined range is prevented. According to FIG. 5, the normally open gate circuits T1 and T2, similar to FIG. 3, are provided for this purpose, over which the oscillations $e1$ and $e2$ respectively arrive at the counter Z1 and Z2 respectively. When one of the signals $v1$ or $v2$ appears, the gate circuit T1 and T2 respectively is thus closed until the signal $v1$ or $v2$ becomes effective, that is, the number $n$ is temporarily increased.

Coincidence circuits K1 and K2 respectively are provided for the production of the signals $v1$ and $v2$. Each of these is fed according to the invention with a sequence of auxiliary impulses ($x1$ and $x2$ respectively) likewise emitted by the counters Z1 and Z2. FIG. 6 shows the method of operation for the case that the frequency of the oscillation $e2$ diminishes, so that the phase $\varphi$ attains the upper limit of the predetermined range. It can be seen that in this case coincidences will occur between the impulses of the sequence $u2$ and the auxiliary impulses of the sequence $x1$ (at $k1$). The coincidence circuit K1 (FIG. 5) will thus respond, and the counting of the cycles in Z1 will be interrupted. The next output impulse of the counter Z1 thus will not appear after $n$ cycles, but later. Care has thus been taken that an impulse of the sequence $u2$ appears always between two impulses each of the sequence $u1$, since the appearance of impulses of the sequence $u1$ is delayed correspondingly, if necessary, by increasing the number $n$.

FIG. 6 shows that there is no coincidence under the given conditions between the impulses of the sequence $u1$ and the auxiliary impulses of the sequence $x2$; such a coincidence ($k2$) occurs only if the phase $\varphi$ has attained the lower limit of the predetermined range. The coincidence circuit K2 will then respond and close the gate circuit T2 temporarily by the signal $v2$.

Figure 7:
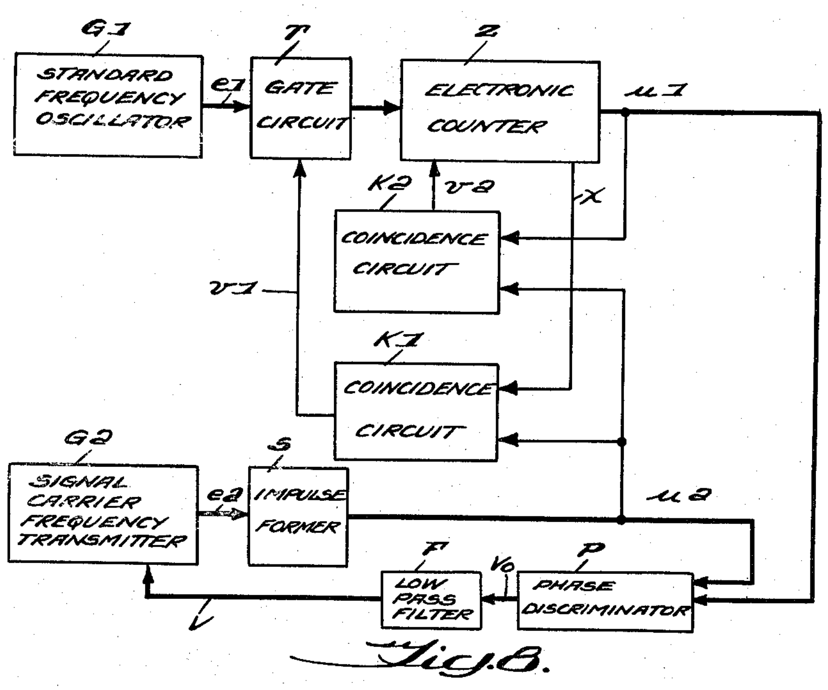
FIG. 7 is also a block schematic electrical diagram illustrating another modification of the arrangement shown in FIG. 3.
Figure 8:
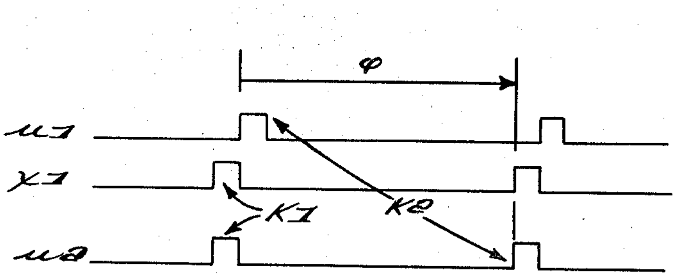
FIG. 8 is a plot of curves showing the relationship between control voltages produced by the circuit of FIG. 7.

FIG. 7 shows a device requiring less expenditure, which operates according to the method of the invention. Only a single counting device Z is here provided, which produces from the oscillation $e1$ the impulse sequence $u1$ and also the auxiliary impulse sequence. In contrast to the counters according to FIG. 5, the counter is so designed in the present case that its return, that is, the start of a new counting, is normally not effected at the time when an output signal $u1$ is emitted, but only after arrival of several additional cycles of the oscillation $e1$. The impulse sequence $u2$ is obtained by the impulse former S from the oscillation $e2$. The arrangement is such that with a large phase $\varphi$, that is, when the impulses $u2$ lag behind the impulses $u1$, the number $n$, is increased, while it is reduced when the phase is small. The increase is effected in the above described manner by temporary closing of the gate circuit T under the influence of the signal $v1$, produced in the coincidence circuit K1. This coincidence circuit is fed, as described above, on the one hand with the impulse sequence $u2$ and on the other hand with the auxiliary impulse sequence $x$. FIG. 8 shows the coincidence at $k1$, which is determinant in this case. It also shows that a coincidence occurs between the impulse sequences $u1$ and $u2$ with a very small phase $\varphi$. Such a coincidence is utilized by the coincidence circuit K2. The latter produces the signal $v2$, which is used to return the counter prematurely, that is, at the time when the output signal $u1$ is emitted. This corresponds to the reduction of the number $n$ intended for this case.

The reduction of the number $n$ in the last mentioned case can also be effected by signal $v2$ by stepping up one step of the counter by at least one unit. For example, in a counter operating on the decimal system, the tens decade that is, the second counter step is stepped up, by one unit by the signal $v2$. This is equivalent to a counting of 10 cycles of the oscillation $e1$ and effects a premature arrival at that counter position at which the return takes place. In this manner a premature return of the counter is also enforced.

I claim:

1. In a frequency control system, a first and a second generator of oscillations, the frequency of oscillation of said second generator being controlled by a regulating voltage depending upon the difference between the frequencies of oscillation of said generators, a counter coupled to each of said generators by means of a normally open gate circuit whereby after the arrival of a constant number of cycles of oscillaton each of said counter emits an output pulse bringing the counter into zero position for immediate start of the next counting cycle, a phase discriminator coupled to the output of each counter for producing a regulating voltage according to the phase difference of said output pulses, said regulating voltage being fed to the second generator through a low-pass filter, two coincidence circuits, the output of each coincidence circuit being connected with the control input of one of said gate circuits, one input of each coincidence circuit being connected crosswise with the output of one of said counters and the other input of each coincidence circuit being connected with means for producing pulses preceding the output pulses of said counters in time, whereby an output pulse of one of said coincidence circuits closes one of said gate circuits.

2. A frequency control system according to claim 1, wherein said means for producing pulses preceding the output pulses of said counters in time comprise two differentiating circuits, the input of each being connected with the output of one of the counters.

3. A frequency control system according to claim 1 wherein said counters comprise means for producing auxiliary pulses preceding the output pulses of said counters in time.

4. In a frequency control system, a first and a second generator of oscillations, the frequency of oscillation of said second generator being controlled by a regulating voltage depending upon the difference between the frequencies of oscillation of said generators, a counter coupled to said first generator by means of a normally open gate circuit, said counter emitting after the arrival of a constant number of cycles of oscillation an output pulse bringing the counter into zero position for immediate start of the next counting cycle, and further comprising means for producing auxiliary pulses preceding the output pulses of said counter in time, and means for returning said counter prematurely into zero position, a pulse former circuit connected with said second generator, a phase discriminator coupled to the output of said counter and to the output of said pulse former circuit for producing a regulating voltage according to the phase difference of the output pulses of said counter and said pulse former circuit, said regulating voltage being fed to the second generator through a low-pass filter, a first coincidence circuit one input of which is connected with the output of said counter, the other input being connected with the output of said pulse former circuit, a second coincidence circuit one input of which is fed with said auxiliary pulses, the other input being connected with the output of said pulse former circuit, an output pulse of said first coincidence circuit returning said counter prematurely into zero position and an output pulse of said second coincidence circuit closing said gate.

References Cited in the file of this patent

UNITED STATES PATENTS

| | | |
|---|---|---|
| 2,490,499 | Woodward | Dec. 6, 1949 |
| 2,490,500 | Young | Dec. 6, 1949 |
| 2,641,706 | Dickinson | June 9, 1953 |
| 2,863,117 | Graustein | Dec. 2, 1958 |
| 2,878,448 | Maxey | Mar. 17, 1959 |

FOREIGN PATENTS

| | | |
|---|---|---|
| 839,442 | Great Britain | Sept. 27, 1957 |